US012623666B2

(12) United States Patent
Mitchell et al.

(10) Patent No.: US 12,623,666 B2
(45) Date of Patent: May 12, 2026

(54) SYSTEM FOR LOCALIZING THREE-DIMENSIONAL OBJECTS

(71) Applicant: FORD GLOBAL TECHNOLOGIES, LLC, Dearborn, MI (US)

(72) Inventors: Nikolaus Jonathan Mitchell, Atlanta, GA (US); Yong-Dian Jian, Palo Alto, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 1150 days.

(21) Appl. No.: 17/523,291

(22) Filed: Nov. 10, 2021

(65) Prior Publication Data

US 2023/0147434 A1 May 11, 2023

(51) Int. Cl.
*B60W 40/04* (2006.01)
*G01S 17/42* (2006.01)
(Continued)

(52) U.S. Cl.
CPC ............. *B60W 40/04* (2013.01); *G01S 17/42* (2013.01); *G01S 17/894* (2020.01);
(Continued)

(58) Field of Classification Search
CPC . B60W 40/04; B60W 2420/408; G01S 17/42; G01S 17/894; G01S 17/931;
(Continued)

(56) References Cited

U.S. PATENT DOCUMENTS 8,559,673 B2 10/2013 Fairfield et al.
10,338,223 B1 7/2019 Englard et al.
(Continued)

FOREIGN PATENT DOCUMENTS

JP 2010057105 A * 3/2010
WO 2019161300 A1 8/2019

OTHER PUBLICATIONS

Zhang et al., "Shape segmentation by hierarchical splat clustering," ScienceDirect, International Conference Shape Modeling International, vol. 51, pp. 136-145, 2015. doi: https://doi.org/10.1016/j.cag.2015.05.012. (Year: 2015).*

(Continued)

*Primary Examiner* — Emily C Terrell
*Assistant Examiner* — Julia Z. Yao
(74) *Attorney, Agent, or Firm* — Frank A. MacKenzie; Brooks Kushman P.C.

(57) ABSTRACT

Disclosed herein are system, method, and computer program product embodiments for localizing three-dimensional objects relative to a vehicle. The system includes: at least one sensor for generating two-dimensional (2D) data and a three-dimensional (3D) point cloud of an environment external to a vehicle. The 3D point cloud includes object points associated with a stationary traffic control object. The localization system also includes a memory and at least one processor coupled to the memory. The processor is programmed to: select a bounding box associated with the object from the memory based on the 2D data; arrange the bounding box proximate to the object points in the 3D point cloud; assign a weight to each point of the 3D point cloud based on a position of the point relative to the bounding box; filter the weighted points; and generate a 3D location of the object based on the filtered points.

20 Claims, 5 Drawing Sheets

(51) Int. Cl.

| | |
|---|---|
| *G01S 17/894* | (2020.01) |
| *G01S 17/931* | (2020.01) |
| *G06F 18/23* | (2023.01) |
| *G06T 7/73* | (2017.01) |
| *G06V 20/58* | (2022.01) |

(52) U.S. Cl.
CPC ............ *G01S 17/931* (2020.01); *G06F 18/23* (2023.01); *G06T 7/74* (2017.01); *G06V 20/584* (2022.01); *B60W 2420/408* (2024.01); *G06T 2207/10028* (2013.01); *G06T 2207/30252* (2013.01)

(58) Field of Classification Search
CPC ...... G01S 7/4802; G01S 7/4808; G01S 17/86; G01S 13/867; G01S 17/89; G06F 18/23; G06T 7/74; G06T 2207/10028; G06T 2207/30252; G06T 7/521; G06T 7/70; G06T 5/70; G06T 2210/12; G06V 20/584; G06V 20/56; G06V 10/44; G06V 20/58; G06V 20/64
See application file for complete search history.

(56) References Cited

U.S. PATENT DOCUMENTS

| | | | |
|---|---|---|---|
| 10,401,866 | B2 | 9/2019 | Rust |
| 10,509,402 | B1 | 12/2019 | Ferguson et al. |
| 10,699,421 | B1 * | 6/2020 | Cherevatsky ....... G06F 18/2113 |
| 2016/0224856 | A1 * | 8/2016 | Park .......................... G06T 7/50 |
| 2018/0188060 | A1 | 7/2018 | Wheeler et al. |
| 2018/0189578 | A1 * | 7/2018 | Yang .................. G01C 21/3635 |
| 2018/0341019 | A1 | 11/2018 | Sakai et al. |
| 2019/0061771 | A1 | 2/2019 | Bier et al. |
| 2019/0147600 | A1 | 5/2019 | Karasev et al. |
| 2019/0172249 | A1 * | 6/2019 | Kaza ....................... G06T 15/08 |
| 2019/0258876 | A1 | 8/2019 | Liu et al. |
| 2019/0329768 | A1 | 10/2019 | Shalev-Shwartz et al. |
| 2019/0340775 | A1 * | 11/2019 | Lee ......................... G05D 1/024 |
| 2020/0200912 | A1 * | 6/2020 | Chen .................... G06V 20/582 |
| 2020/0218979 | A1 * | 7/2020 | Kwon ...................... G06N 3/08 |
| 2021/0011161 | A1 | 1/2021 | Chen et al. |
| 2021/0033706 | A1 | 2/2021 | Funaya |
| 2021/0272304 | A1 * | 9/2021 | Yang .................... G06V 10/454 |
| 2022/0012466 | A1 * | 1/2022 | Taghavi .............. G06F 18/2163 |
| 2022/0019845 | A1 * | 1/2022 | Zhang .................... G06V 20/56 |
| 2022/0301203 | A1 * | 9/2022 | Ambrus .............. G06F 18/2113 |

OTHER PUBLICATIONS

Ashraf et al., "An Investigation of Interpolation Techniques to Generate 2D Intensity Image From LIDAR Data," in IEEE Access, vol. 5, pp. 8250-8260, 2017, doi: 10.1109/ACCESS.2017.2699686. (Year: 2017).*

Qin et al., "3D change detection at street level using mobile laser scanning point clouds and terrestrial images," 2014, ISPRS Journal of Photogrammetry and Remote Sensing, vol. 90, pp. 23-35. https://doi.org/10.1016/j.isprsjprs.2014.01.006. (Year: 2014).*

Jurado et al. Semantic Segmentation of Natural Materials on a Point Cloud Using Spatial and Multispectral Features. Sensors 2020, 20, 2244. https://doi.org/10.3390/s20082244 (Year: 2020).*

Pajarola et al., "Confetti: object-space point blending and splatting," in IEEE Transactions on Visualization and Computer Graphics, vol. 10, No. 5, pp. 598-608, Sep.-Oct. 2004, doi: 10.1109/TVCG.2004. 19. (Year: 2004).*

Wellesley College, "CS307: Transparency, Text, Shadows, Anti-Aliasing," Web page <https://cs.wellesley.edu/~cs307/lectures-s21/Transparency-Shadows.html>, 20 pages, retrieved Oct. 28, 2021.

Extended European Search Report of European patent application No. 22206697.9 dated Mar. 13, 2023, 10 pages.

* cited by examiner

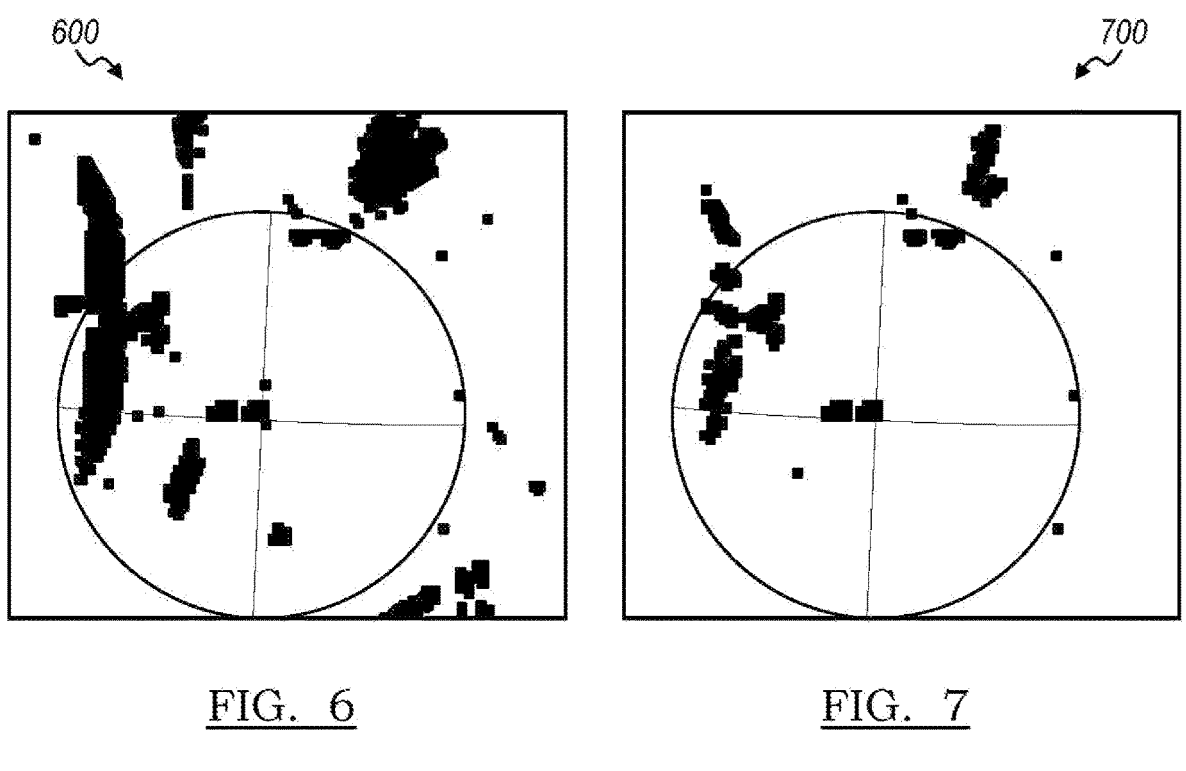
FIG. 6                  FIG. 7
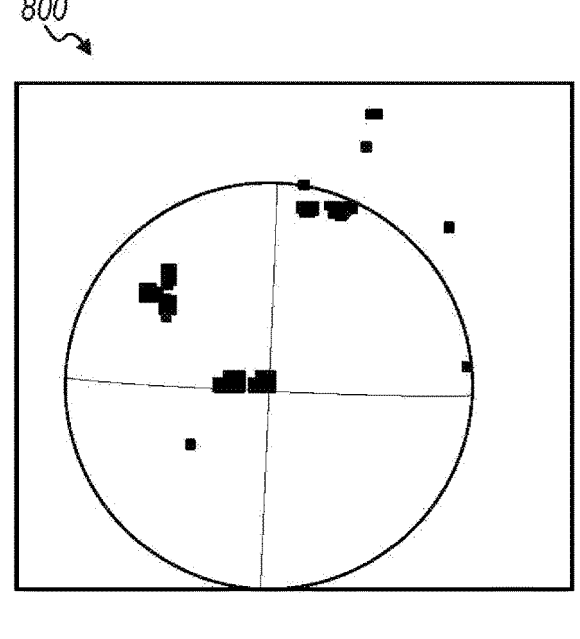
FIG. 8

SYSTEM FOR LOCALIZING THREE-DIMENSIONAL OBJECTS

TECHNICAL FIELD

One or more embodiments relate to a system and method for localizing a three-dimensional object relative to a vehicle.

BACKGROUND

A vehicle may include a system to monitor its external environment to detect the presence of specific objects, e.g., traffic lights, street signs, and other vehicles. The system may also determine the three-dimensional (3D) location of the specific objects relative to the vehicle. The vehicle may control one or more other vehicle systems based on these 3D locations. For example, the vehicle may control a brake system to stop the vehicle based on the location and/or status of a traffic light or remote vehicle. The system may include sensors or cameras for detecting the objects. The system may also use one or more strategies to determine the location of the objects based on data from the sensors or cameras.

There are a number of different existing locating methods. One method uses generic multi-view geometry algorithms that are based on concepts of triangulation and two-dimensional images from the cameras. However, such methods are typically inaccurate with errors over one meter. Another method uses a deep learning network to directly regress the object location from the sensor data. However, such deep learned versions typically require extensive manual labeling and storage of predetermined data based on this labeling. Other methods utilize certain characteristics of an object (e.g., a sign is flat), and create a custom algorithm for that specific object. However, such methods often can't distinguish between similar shaped objects. For example, if there are multiple instances of the same or similar object within a scene, e.g., multiple traffic lights, these strategies may not be able to distinguish the traffic lights without an additional complicated tracking algorithm.

SUMMARY

In one embodiment, a localization system includes at least one sensor for generating two-dimensional (2D) data and a three-dimensional (3D) point cloud of an environment external to a vehicle. The 3D point cloud includes object points associated with an object. The localization system also includes a memory and at least one processor coupled to the memory. The processor is programmed to: select a bounding box associated with the object from the memory based on the 2D data; arrange the bounding box proximate to the object points in the 3D point cloud; assign a weight to each point of the 3D point cloud based on a position of the point relative to the bounding box; filter the weighted points; and generate a 3D location of the object based on the filtered points.

In another embodiment, a method is provided for localizing an object relative to a vehicle. Two-dimensional (2D) data and a three-dimensional (3D) point cloud of an environment external to the vehicle are received from at least one sensor. The 3D point cloud includes object points associated with a stationary traffic control object. A bounding box associated with the stationary traffic control object is selected based on the 2D data. The bounding box is arranged proximate to the object points in the 3D point cloud. A weight is assigned to each point of the 3D point cloud based on a position of the point relative to the bounding box. The weighted points are filtered. A 3D location of the stationary traffic control object is generated based on the filtered points.

In yet another embodiment, a non-transitory computer-readable medium having instructions stored thereon is provided. The instructions, when executed by at least one computing device, cause the at least one computing device to perform operations comprising: selecting a bounding box associated with a stationary traffic control object based on two-dimensional (2D) data; arranging the bounding box proximate to object points in a three-dimensional (3D) point cloud of an environment external to a vehicle, wherein the object points are associated with the stationary traffic control object; assigning a weight to each point of the 3D point cloud based on a position of the point relative to the bounding box; filtering the weighted points; and generating a 3D location of the stationary traffic control object based on the filtered points.

BRIEF DESCRIPTION OF THE DRAWINGS

FIG. 6 illustrates a 3D point cloud generated by the system according to the method of FIG. 3.

FIG. 7 illustrates a filtered 3D point cloud generated by the system, and filtered to remove low weight points according to the method of FIG. 3.

FIG. 8 illustrates a filtered 3D point cloud generated by the system, and filtered to remove low and medium weight points according to the method of FIG. 3.

In the drawings, like reference numbers generally indicate identical or similar elements. Additionally, generally, the left-most digit(s) of a reference number identifies the drawing in which the reference number first appears.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figures 1, 2:
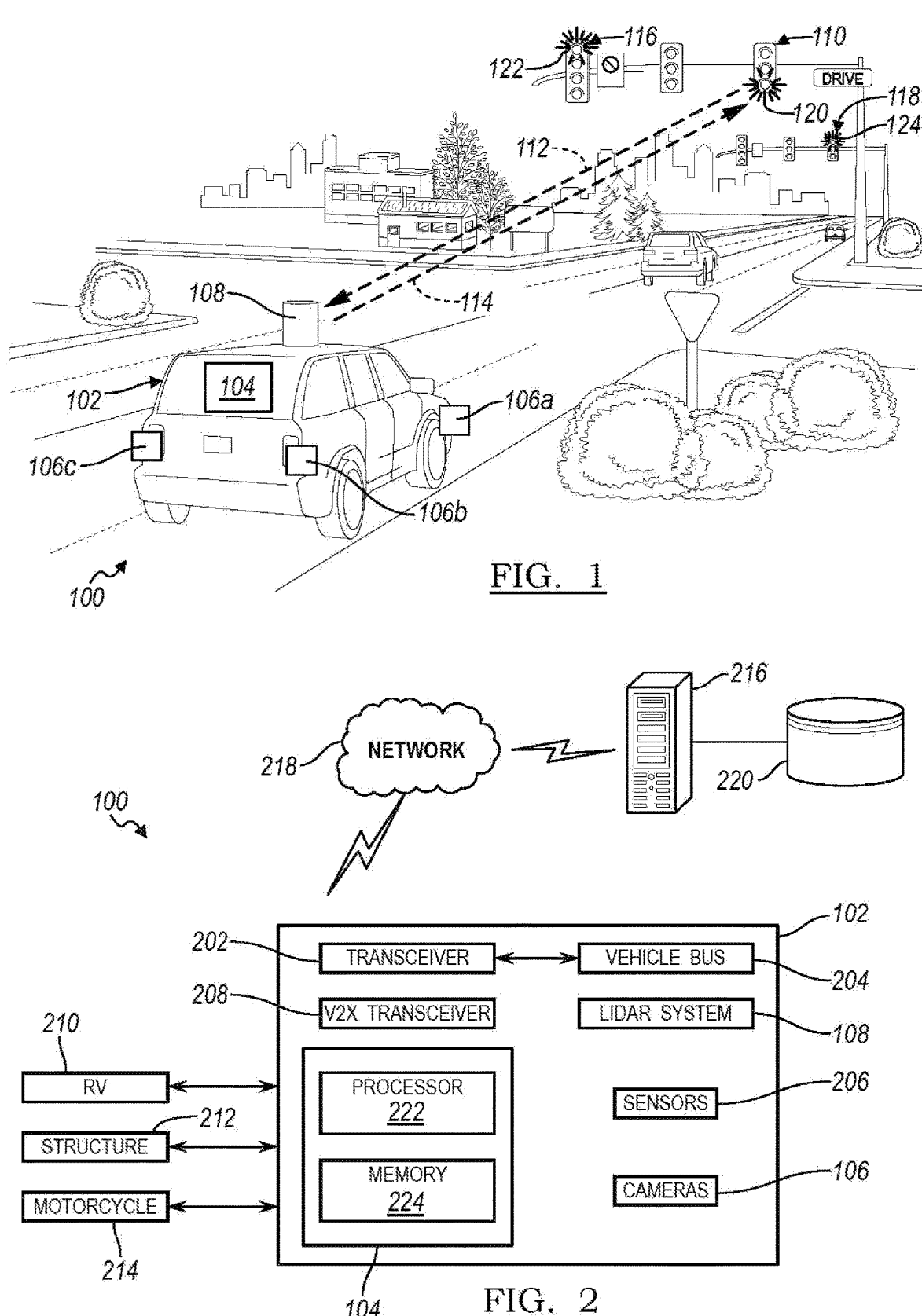
FIG. 1 is a schematic view of an autonomous vehicle with a system for localizing a 3D object, in accordance with one or more embodiments.
FIG. 2 is a schematic diagram illustrating communication between the system and other systems.

With reference to FIG. 1, a system for detecting the 3D location of an object relative to a vehicle is illustrated in accordance with one or more embodiments and is generally referenced by numeral 100. The system 100 is depicted within an autonomous vehicle (AV) 102. The system 100 includes a controller 104, at least one camera 106, and a sensor system 108. The AV 102 is illustrated approaching a first traffic light 110. The system 100 combines a 2D bounding box that is based on data from the camera 106, with 3D data from the sensor system 108, to determine the 3D location of a stationary traffic control object, such as the first traffic light 110, a traffic sign (not shown) or other traffic instruction indicator, relative to the AV 102. By combining 2D data and 3D data to determine the 3D location of the object, the system 100 is more accurate, and uses less human generated labeling and corresponding storage, than existing systems.

In the illustrated embodiment, the system 100 includes multiple cameras 106a, 106b, and 106c to capture images of the external environment about the AV 102. The cameras 106 may include visible spectrum cameras, infrared cameras, etc. In one embodiment, the system 100 includes eight cameras distributed about the vehicle to capture images of the external environment 360 degrees about the AV 102.

The sensor system 108 includes a lidar system that is mounted to a roof of the AV 102, according to one or more embodiments. The lidar system 108 transmits light pulses 112 away from the AV 102. The transmitted light pulses 112 are incident on one or more objects (e.g., the first traffic light 110), and reflect back toward the lidar system 108 as a reflected light pulses 114. The controller 104 processes the reflected light pulses 114 to determine a distance of the first traffic light 110 relative to the AV 102. The lidar system 108 may include one or more emitters (not shown) for transmitting the light pulses 112, and an array of photodetectors (not shown) to receive reflected light pulses 114.

The lidar system 108 may rotate about a vertical axis (not shown) to scan the external environment about the AV 102. The lidar system 108 may analyze the reflected light pulses 114 over time as the AV 102 moves to generate 3D data, e.g., a 3D point cloud. A point cloud refers to a set of data points in space. The points may represent a 3D shape or object, and each point position has its set of Cartesian coordinates (X, Y, Z).

The system 100 distinguishes similar objects in the environment external to the AV 102, by separately localizing each one. For example, in the illustrated embodiment, the AV 102 is shown approaching multiple traffic lights, including the first traffic light 110, a second traffic light 116 and a third traffic light 118. The AV 102 is illustrated travelling in a right lane and approaching an intersection. The first traffic light 110, which is associated with the right lane, has an illuminated green light 120, which is represented by lines extending from the lower light. The second traffic light 116 is associated with a left turn lane at the intersection and has an illuminated red light 122, which is represented by lines extending from the upper light. The third traffic light 118 is associated with the right lane at a distant intersection and has an illuminated red light 124, which is represented by lines extending from the upper light. The system 100 localizes the position of each traffic light 110, 116, and 118 relative to the AV 102 to determine which one is applicable. Then the system 100 analyzes the current status of the applicable traffic light, i.e., which light is illuminated, to determine how to control the AV 102, e.g., whether to proceed through the intersection, or stop prior to it.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Notably, the system 100 is being described herein in the context of an autonomous vehicle. However, the system 100 is not limited to autonomous vehicle applications; it may be used in other applications such as robotic applications, radar system applications, metric applications, and/or system performance applications.

FIG. 2 illustrates communication between the system 100 and other systems and devices according to one or more embodiments. The system 100 includes a transceiver 202 that is connected to the controller 104 for communicating with other systems of the AV 102.

The transceiver 202 receives information that is indicative of present operating conditions of various systems of the AV 102, e.g., an engine, a transmission, a navigation system, a brake system, etc. (not shown). The transceiver 202 may communicate directly with other systems or communicate indirectly with other systems over a vehicle communication bus 204, e.g., a CAN bus. For example, the transceiver 202 may receive information such as vehicle speed, engine speed, turn signal status, brake position, vehicle position, and steering angle over the vehicle communication bus 204.

The transceiver 202 also receives information that is indicative of the external environment of the AV 102, e.g., from the cameras 106 and the lidar system 108. The external environment information describes the location of objects relative to the AV 102, e.g., the location of the traffic lights 110, 116, 118 shown in FIG. 1. The external environment information also includes information about the environment itself, e.g., which light is currently illuminated on each traffic light 110, 116, 118, or data pertaining to the surface of the road. The external environment information may also include information about the motion of the AV 102 and/or information about a route of the AV 102. The transceiver 202 may receive this external environment information directly, or indirectly over the vehicle communication bus 204.

The system 100 may communicate with additional sensors 206 of the AV 102, to receive external environment information. These additional sensors 206 may include a radio detection and ranging (RADAR) system, a laser detection and ranging (LADAR) system, a sound navigation and ranging (SONAR) system, temperature sensors, position sensors (e.g., global positioning system (GPS), etc.), location sensors, fuel sensors, motion sensors (e.g., inertial measurement units (IMU), etc.), humidity sensors, occupancy sensors, or the like.

The system 100 may also communicate with devices and systems that are located remote from the AV 102, to share the external environment information and/or to collect additional external environment information. The system 100 may include a vehicle-to-everything (V2X) transceiver 208 that is connected to the controller 104 for communicating with other vehicles and structures. For example, the system 100 may use the V2X transceiver 208 for communicating directly with a remote vehicle (RV) 210 by vehicle-to-vehicle (V2V) communication, a structure 212 (e.g., a sign, a building, or a traffic light) by vehicle-to-infrastructure (V2I) communication, or a motorcycle 214 by vehicle-to-motorcycle (V2M) communication. Each V2X device may provide information indictive of its own status, or the status of another V2X device. For example, the RV 210 may provide information that is indicative of the status of a distant traffic light.

The system 100 may communicate with a remote computing device 216 over a communications network 218 using one or more of the transceivers 202, 208. The remote computing device 216 may include one or more servers to process one or more processes of the technology described herein. The remote computing device 216 may also communicate data with a database 220 over the network 218.

Although the controller 104 is described as a single controller, it may contain multiple controllers, or may be embodied as software code within one or more other controllers. The controller 104 includes a processing unit, or processor 222, that may include any number of microprocessors, ASICs, ICs, memory (e.g., FLASH, ROM, RAM, EPROM and/or EEPROM) and software code to co-act with one another to perform a series of operations. Such hardware and/or software may be grouped together in assemblies to perform certain functions. Any one or more of the controllers or devices described herein include computer executable instructions that may be compiled or interpreted from computer programs created using a variety of programming languages and/or technologies. The controller 104 also includes memory 224, or non-transitory computer-readable storage medium, that is capable of executing instructions of a software program. The memory 224 may be, but is not limited to, an electronic storage device, a magnetic storage device, an optical storage device, an electromagnetic storage device, a semi-conductor storage device, or any suitable combination thereof. In general, the processor 222 receives instructions, for example from the memory 224, a computer-readable medium, or the like, and executes the instructions. The controller 104, also includes predetermined data, or "look up tables" that are stored within memory, according to one or more embodiments.

Figure 3:
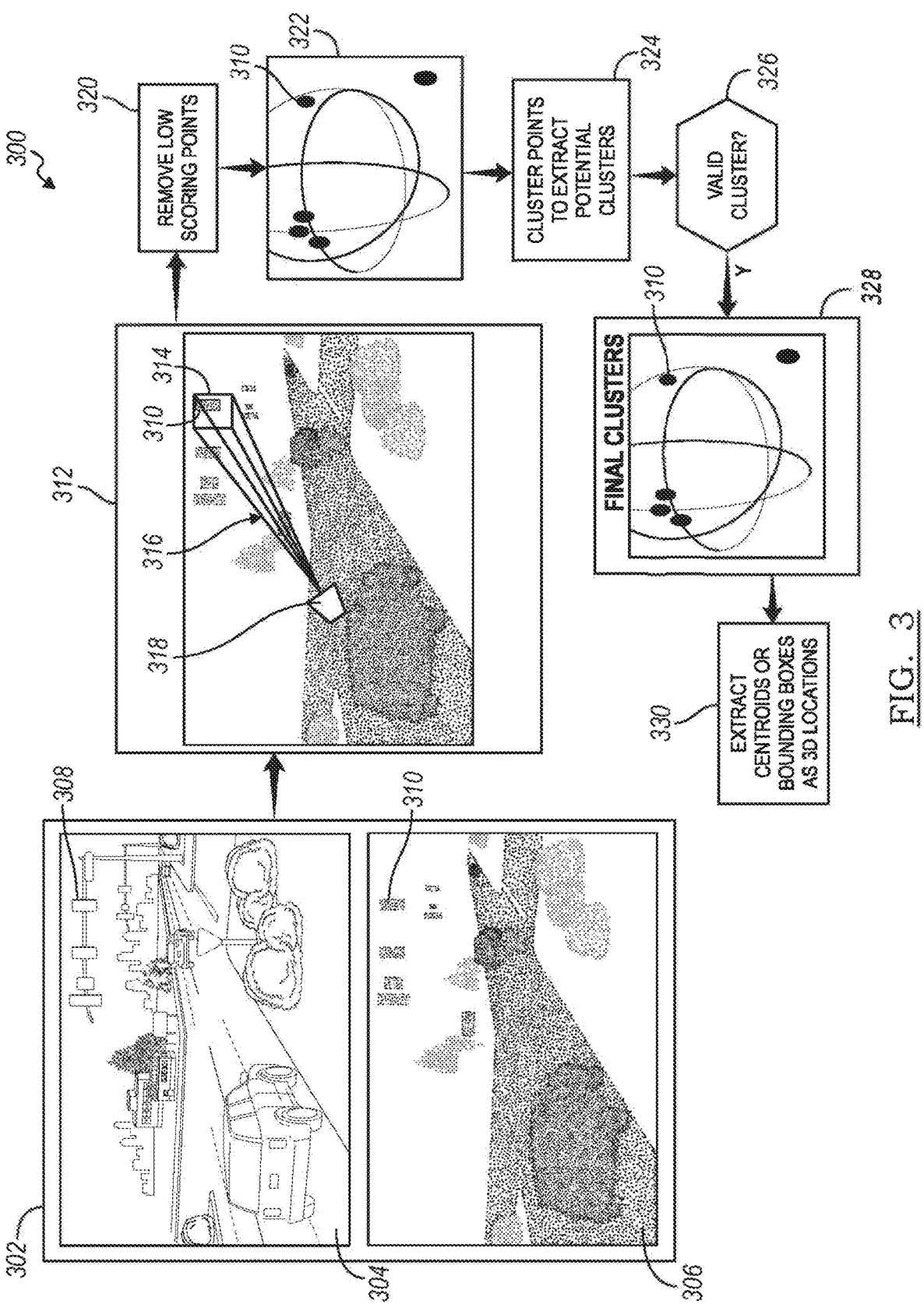
FIG. 3 is a flow chart illustrating a method for localizing the 3D object, in accordance with one or more embodiments.

With reference to FIG. 3, a flow chart depicting a method for detecting the 3D location of an object relative to a vehicle is illustrated in accordance with one or more embodiments and is generally referenced by numeral 300. The method 300 is implemented using software code that is executed by the processor 222 and contained within the memory 224 (FIG. 2) according to one or more embodiments. While the flowchart is illustrated with a number of sequential steps, one or more steps may be omitted and/or executed in another manner without deviating from the scope and contemplation of the present disclosure.

At step 302, the processor 222 receives input that is indicative of the external environment of the AV 102. The processor 222 receives 2D image data 304 from the cameras 106 and 3D point cloud data 306 from the lidar system 108. The 2D image data 304 includes traffic light data 308 that corresponds with the first traffic light 110 of FIG. 1. The lidar system 108 generates a 3D point cloud that includes different colored points, where each color is associated with a type of object. For example, the lidar system 108 may generate green points for vegetation (illustrated as grey dots), yellow points for lights (illustrated as dark gray dots), and pink points for pavement (illustrated as light grey dots). The 3D point cloud data 306 includes yellow points 310 that correspond with the first traffic light 110 of FIG. 1.

At step 312 the processor 222 assigns weights to the points in the 3D point cloud that are associated with objects of interest, e.g., the traffic light points 310. The processor 222 generates a rectangle, or 2D bounding box 314 based on the 2D images, about an object of interest in the 3D point cloud, e.g., the traffic light points 310. In one or more embodiments, the processor 222 identifies an object from the 2D image data, then retrieves the 2D bounding box 314 associated with the object from the memory 224. Then the processor 222 generates a polyhedron, such as a square frustum 316, that extends between a camera position 318 and the position of the bounding box 314. Then the processor 222 increases the weight of points that are located within the square frustum 316.

Also at step 312, the processor 222 analyzes the 3D point cloud to determine if points are occluded, or blocked, by other objects. Referring back to FIG. 1, as the AV 102 approaches the intersection, the first traffic light 110 may partially align with the third traffic light 118 from the point of view of the AV 102.

This alignment between similar devices may result in confusion or association issues for existing lidar systems, especially if different lights are illuminated. For example, an existing lidar system may be confused if it can not distinguish between the first traffic light 110 and the third traffic light 118, when different lights are illuminated on each light.

Figure 4:
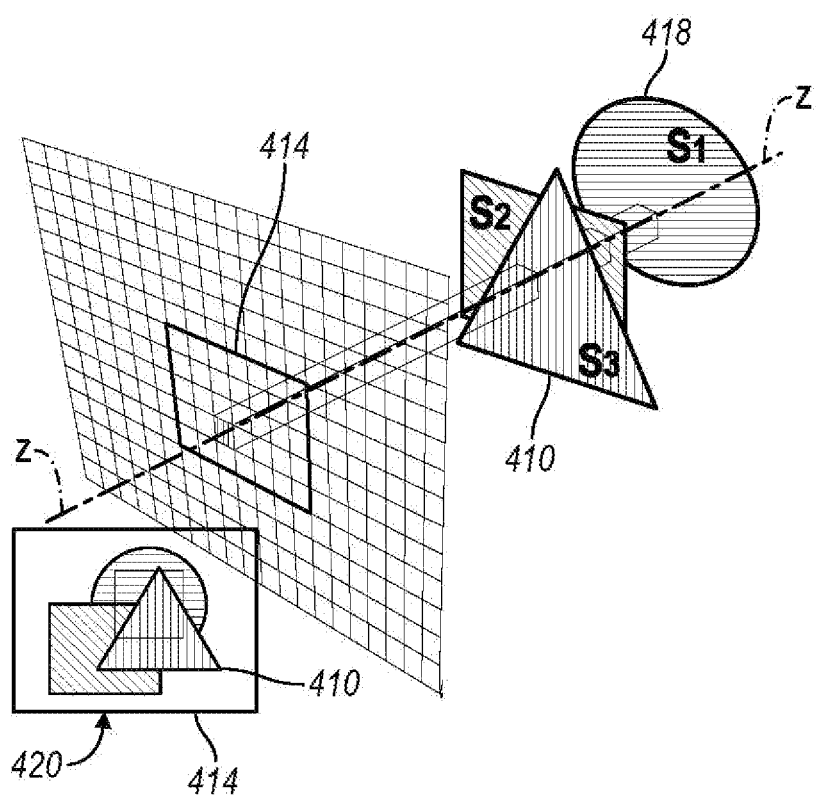
FIG. 4 is a schematic diagram illustrating an occlusion test to weight points according to the method of FIG. 3.

With reference to FIG. 4, the processor 222 may use a z-buffering approach to detect occlusion. Using z-buffering, only the point with the lowest depth along a longitudinal axis Z-Z, or z-axis, extending between the camera (not shown) and the object of interest is accepted. FIG. 4 illustrates a triangle 410 that represents traffic light points 310 that are associated with the first traffic light 110, and a circle 418 that represents the points associated with the third traffic light 118. The triangle 410 and the circle 418 may overlap, as shown in 2D image 420, resulting in association issues when analyzing the shape of the traffic light 110. Accordingly, the processor 222 assigns higher weight to points that are closer to the camera position within the bounding box 414 (e.g., the triangle 410) than points that are farther away (e.g., the circle 418).

Figure 5:
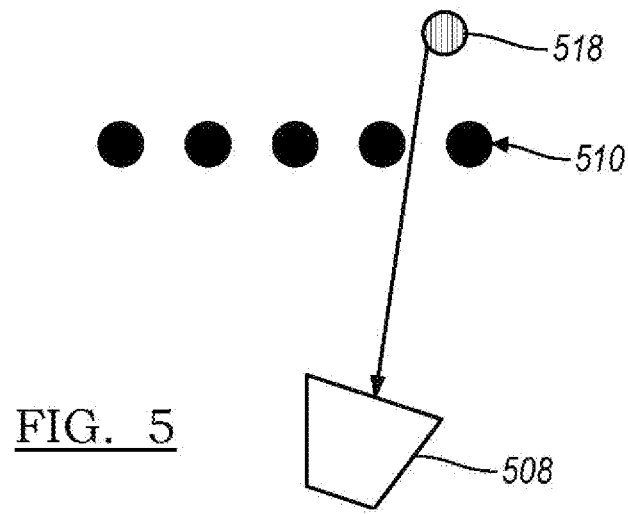
FIG. 5 is a diagram illustrating a projection test to weight points according to the method of FIG. 3.

Referring to FIG. 5, the processor 222 may use a splatting approach to overcome projection issues with sparse point clouds. The first traffic light 110 of FIG. 1 is represented by first traffic light points 510, and the third traffic light 118 is represented by point 518. If the first traffic light 110 is located far away from a lidar system position 508, the 3D point cloud may be sparse, as represented by the first traffic light points 510 being spaced apart from each other in FIG. 5, which allows the third traffic light point 518 to project through the first traffic light points 510. This projection issue may complicate the z-buffering approach described with reference to FIG. 4. Accordingly, the processor 222 may project each point to an area of pixels, rather than to a single pixel. These additional pixels are generally represented by the overlapping shapes in the 2D image 420 of FIG. 4.

The processor 222 may assign a weight to the points by incrementing a value associated with a point that passes the occlusion test (FIG. 4) and the splatting approach (FIG. 5). The processor 222 may also increment the weight of the points that are located in the center of the bounding box 314, e.g., radially adjacent to the longitudinal axis Z-Z (FIG. 4), larger than points that are located near the edge of the bounding box 314. The processor 222 may also weight points based on data generated by a different algorithm or system e.g., external environment data that has been analyzed and labeled by another system and received from the remote computing device 216. For example, in one embodiment, the processor 222 receives semantic data for points that have been analyzed and labeled by another system.

Referring back to FIG. 3, at step 320, the processor 222 filters or removes low weight points. The processor 222 may compare the weighted value of each point to a threshold value, and remove weighted values that are less than the threshold value.

In one embodiment, each point is assigned a default value of one. The processor 222 weights each point that is located within the square frustum 316 by incrementing its value by four. Then the processor 222 weights each point that passes the occlusion test (FIG. 4) and the splatting test (FIG. 5), by incrementing its value by five. This weighting approach results in points having values of one, five, and ten.

FIGS. 6-8 illustrate filtering the point cloud based on weight. FIG. 6 illustrates an unfiltered point cloud 600. For example, the threshold value may be set to zero, and each point that has a weighted value of at least one is shown.

FIG. 7 illustrates a partially filtered point cloud 700. For example, the threshold value may be set to four, and the processor 222 filters or removes points that have weighted values less than five, e.g., points that are outside of the square frustum 316.

FIG. 8 illustrates a fully filtered point cloud 800. For example, the threshold value may be set to nine, and the processor 222 filters or removes points that have weighted values less than ten, e.g., the processor 222 removes points that are associated with the third traffic light 118 that appear in the square frustum 316, but did not pass the occlusion test.

At step 324, the processor 222 clusters the remaining high weight points to form potential cluster points. By clustering points after they are weighted and filtered, there is a high confidence that the clustered points are valid. At step 326, the processor 222 compares the potential cluster points to predetermined data associated with the size and shape of the traffic light 110, such as a minimum size and number of points. If a potential cluster meets this criteria, the processor 222 identifies it as a final cluster. The final clusters, including the first traffic light points 310, are illustrated in image 328. At step 330, the processor 222 sets the 3D location of the first traffic light 110 based on the bounding box 314, or the centroid of the bounding box 314.

Existing strategies for localizing a 3D object suffer from one or more limitations. Some existing strategies are too specific, i.e., the algorithm may only work on a specific object it was designed for, e.g., a specific traffic light. Other existing strategies are inaccurate, e.g., they existing generic multi-view geometry algorithms can have up to one meter of error. Other existing strategies has association problems. For example, often there are multiple instances of the same/similar object within a scene, e.g., multiple traffic lights, and existing strategies can't distinguish the traffic lights without an additional complicated tracking algorithm. Other existing strategies for deep learned versions require training data from extensive manual input to label each object.

The system 100 provides improvements over such existing strategies because it identifies any object that has a predetermined 2D bounding box detector, which is now readily available. The system 100 does not require specialized algorithms for each type of object. By combining 3D lidar data with 2D data, e.g., 2D bounding box, the system 100 may reduce the average error for localization of an object to 0.1 m or less. Whereas existing 2D vision-based systems have an average error of one m or more, which makes it difficult to distinguish between similar adjacent objects, e.g., the traffic lights 110, 116, 118 of FIG. 1. The system 100 eliminates the association step common with many existing strategies, because such association is implied by the clustering stage. Although human labeling may be used to develop the 2D bounding box detectors, such human labeling is less time consuming than developing a 3D localization network.

Figure 9:
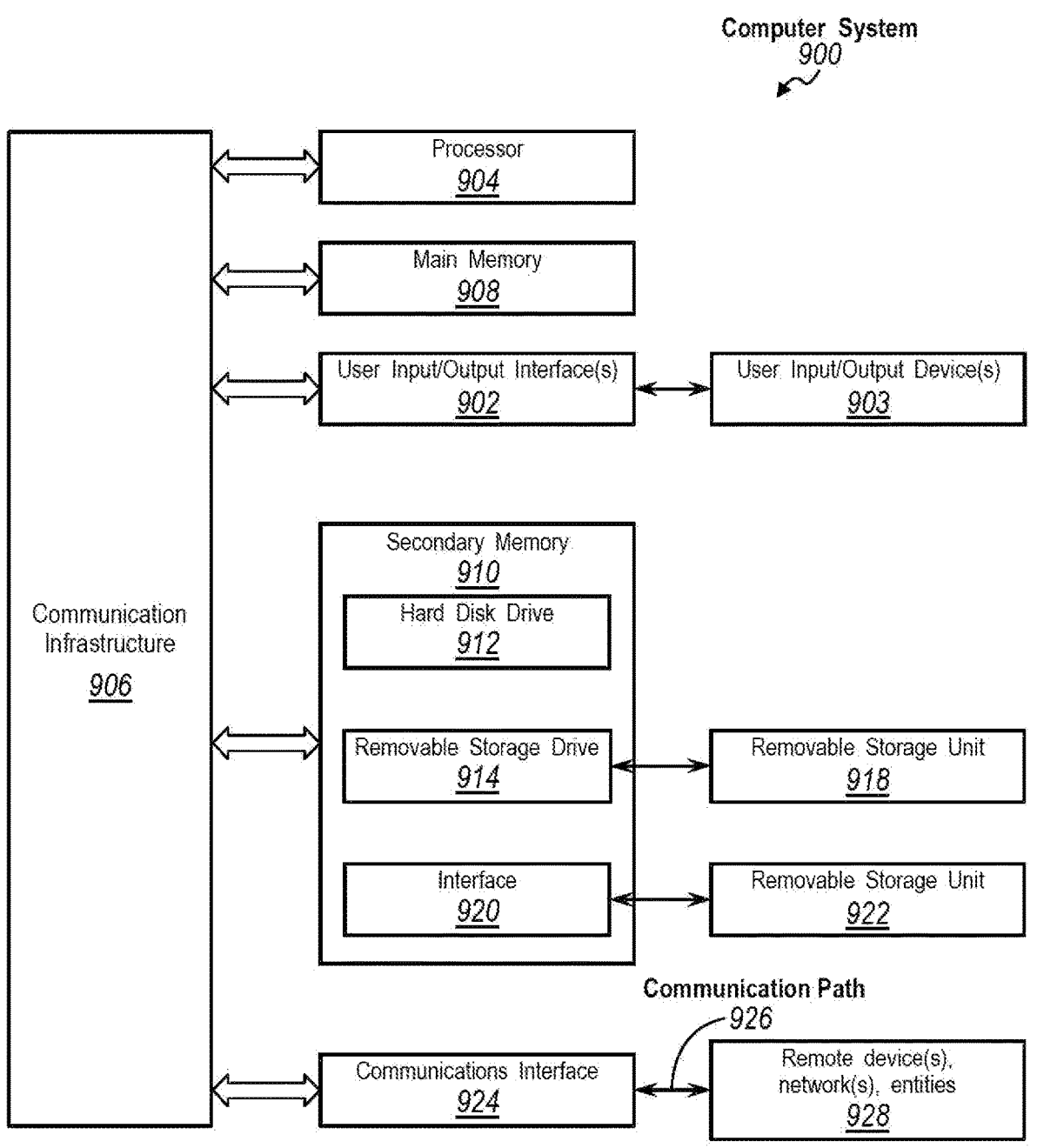
FIG. 9 is detailed schematic diagram of an example computer system for implementing various embodiments.

The system for detecting the 3D location of an object relative to a vehicle may be implemented using one or more computer systems, such as computer system 900 shown in FIG. 9. The computer system 900 may be any computer capable of performing the functions described herein. The computer system 900 also includes user input/output interface(s) 902 and user input/output device(s) 903, such as monitors, keyboards, pointing devices, etc.

The computer system 900 includes one or more processors (also called central processing units, or CPUs), such as a processor 904. The processor 904 is connected to a communication infrastructure or bus 906. The processor 904 may be a graphics processing unit (GPU), e.g., a specialized electronic circuit designed to process mathematically intensive applications, with a parallel structure for parallel processing large blocks of data, such as mathematically intensive data common to computer graphics applications, images, videos, etc.

The computer system 900 also includes a main memory 908, such as random-access memory (RAM), that includes one or more levels of cache and stored control logic (i.e., computer software) and/or data. The computer system 900 may also include one or more secondary storage devices or secondary memory 910, e.g., a hard disk drive 912; and/or a removable storage device 914 that may interact with a removable storage unit 918. The removable storage device 914 and the removable storage unit 918 may be a floppy disk drive, a magnetic tape drive, a compact disk drive, an optical storage device, tape backup device, and/or any other storage device/drive.

The secondary memory 910 may include other means, instrumentalities or other approaches for allowing computer programs and/or other instructions and/or data to be accessed by computer system 900, e.g., an interface 920 and a removable storage unit 922, e.g., a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 900 may further include a network or communication interface 924 to communicate and interact with any combination of remote devices, remote networks, remote entities, etc. (individually and collectively referenced by reference number 928). For example, the communication interface 924 may allow the computer system 900 to communicate with remote devices 928 over a communication path 926, which may be wired and/or wireless, and which may include any combination of LANs, WANs, the Internet, etc. The control logic and/or data may be transmitted to and from computer system 900 via communication path 926.

As described above with reference to FIG. 2, the system 100 may also include a V2X transceiver 208 that is connected to the controller 104 for communicating with other vehicles and structures. The system 100 may use WLAN technology to form a vehicular ad-hoc network as two V2X devices come within each other's range. This technology is referred to as Dedicated Short-Range Communication (DSRC), which uses the underlying radio communication provided by IEE 802.11p. The range of DSRC is typically about 300 meters, with some systems having a maximum range of about 1000 meters. DSRC in the United States typically operates in the 5.9 GHz range, from about 5.85 GHz to about 5.925 GHz, and the typical latency for DSRC is about 50 ms. Alternatively, the system 100 may communicate with another V2X device using Cellular V2X (C-V2X), Long Term Evolution V2X (LTE-V2X), or New Radio Cellular V2X (NR C-V2X).

Connected systems and V2V and V2I applications using DSRC rely on the Basic Safety Message (BSM), which is one of the messages defined in the Society of Automotive standard J 2735, V2X Communications Message Set Dictionary, July 2020. The BSM is broadcast from vehicles over the 5.9 GHz DSRC band, and the transmission range is on the order of 1,000 meters. The BSM consists of two parts. BSM Part 1 contains core data elements, including vehicle position, heading, speed, acceleration, steering wheel angle, and vehicle classification (e.g., passenger vehicle or motorcycle) and is transmitted at an adjustable rate of about 10 times per second. BSM Part 2 contains a variable set of data elements drawn from an extensive list of optional elements. They are selected based on event triggers (e.g., ABS activated) and are added to Part 1 and sent as part of the BSM message, but are transmitted less frequently in order to conserve bandwidth. The BSM message includes only current snapshots (with the exception of path data which is itself limited to a few second's worth of past history data).

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, the computer system 900, the main memory 908, the secondary memory 910, and the removable storage units 918 and 922, as well as tangible articles of manufacture embodying any combination of the foregoing. Such control logic, when executed by one or more data processing devices (such as the computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the detailed description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other. The breadth and scope of this disclosure should not be limited by any of the above-described exemplary embodiments but should be defined only in accordance with the following claims and their equivalents.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A localization system comprising:

at least one sensor for generating two-dimensional (2D) data and a three-dimensional (3D) point cloud of an environment external to a vehicle, wherein the 3D point cloud includes object points associated with an object;

a memory; and at least one processor coupled to the memory and programmed to:

select a bounding box associated with the object from the memory based on the 2D data;

arrange the bounding box about the object points in the 3D point cloud;

assign a weight to each point of the 3D point cloud based on a position of the point relative to the bounding box and based on a result of an occlusion test, wherein the result is determined by:

imposing a first representation to a first collection of points, the first representation being in a first predefined 2D shape that is irrelevant to a shape of the first collection of points, imposing a second representation to a second collection of points, the second representation being in a second predefined 2D shape that is irrelevant to a shape of the second collection of points, the second predefined 2D shape being different from the first predefined 2D shape, and responsive to determining the first predefined 2D shape and the second predefined 2D shape overlap within the bounding box, assigning higher weight for the first collection of points within the bounding box than the second collection of points within the bounding box, the first collection of points being closer to the one or more sensors than the second collection of points to the one or more sensors;

filter the weighted points; and generate a 3D location of the object based on the filtered points.

2. The localization system of claim 1, wherein the at least one processor is further programmed to:

generate a polyhedron extending between a position of the at least one sensor and the bounding box in the 3D point cloud; and increment the weight of each point of the 3D point cloud that is located within the polyhedron.

3. The localization system of claim 1, wherein the at least one processor is further programmed to increment the weight of each point of the 3D point cloud that is located distal to the bounding box along a longitudinal axis extending between a position of the at least one sensor and the bounding box.

4. The localization system of claim 1, wherein the at least one processor is further programmed to increment the weight of each point of the 3D point cloud that is located radially adjacent to a longitudinal axis extending between a position of the at least one sensor and the bounding box.

5. The localization system of claim 1, wherein the at least one processor is further programmed to filter the weighted points by removing weighted points that are less than a threshold value.

6. The localization system of claim 1, wherein the at least one processor is further programmed to:

cluster the filtered points; and generate the 3D location of the object based on at least one of a comparison of the clustered points to predetermined data associated with a size and shape of the object, and a centroid of the clustered points.

7. The localization system of claim 1, wherein the at least one processor is further programmed to:

cluster the filtered points to form potential clustered points;

compare the potential clustered points to predetermined data associated with a size and shape of the object to determine final clustered points; and generate the 3D location of the object based on a centroid of the final clustered points.

8. The localization system of claim 1, wherein the object comprises a stationary traffic control object.

9. The localization system of claim 1, wherein the at least one sensor comprises a lidar system, the lidar system comprising:

at least one emitter for projecting light pulses away from the vehicle;

at least one detector for receiving at least a portion of the light pulses that reflect off of one or more objects in the environment as reflected light pulses; and wherein the lidar system provides the 3D point cloud based on the reflected light pulses.

10. The localization system of claim 1, wherein the at least one sensor comprises a camera for providing the 2D data, the 2D data comprising an image of the object.

11. A method for localizing an object relative to a vehicle, comprising:

receiving two-dimensional (2D) data and a three-dimensional (3D) point cloud of an environment external to the vehicle from at least one sensor, wherein the 3D point cloud includes object points associated with a stationary traffic control object;

selecting a bounding box associated with the stationary traffic control object based on the 2D data;

arranging the bounding box about the object points in the 3D point cloud;

assigning a weight to each point of the 3D point cloud based on a position of the point relative to the bounding box and based on a result of an occlusion test, wherein the result is determined by:

imposing a first representation to a first collection of points, the first representation being in a first custom shape that is irrelevant to a shape of the first collection of points, imposing a second representation to a second collection of points, the second representation being in a second custom shape that is irrelevant to a shape of the second collection of points, the second custom shape being different from the first custom shape, and assigning higher weight for the first collection of points than the second collection of points, the first collection of points being closer to the one or more sensors than the second collection of points to the at least one sensor;

filtering the weighted points; and generating a 3D location of the stationary traffic control object based on the filtered points.

12. The method of claim 11, wherein assigning a weight to each point of the 3D point cloud based on a position of the point relative to the bounding box comprises:

generating a polyhedron extending between a position of the at least one sensor and the bounding box in the 3D point cloud; and incrementing the weight of each point of the 3D point cloud that is located: within the polyhedron, distal to the bounding box along a longitudinal axis extending between the position of the at least one sensor and the bounding box, or radially adjacent to the longitudinal axis.

13. The method of claim 11, wherein filtering the weighted points comprises removing weighted points that are less than a threshold value.

14. The method of claim 11 further comprising:

clustering the filtered points; and generating the 3D location of the stationary traffic control object based on at least one of a comparison of the clustered points to predetermined data associated with a size and shape of the stationary traffic control object, and a centroid of the clustered points.

15. The method of claim 11 further comprising:

clustering the filtered points to form potential clustered points;

comparing the potential clustered points to predetermined data associated with a size and shape of the stationary traffic control object to determine final clustered points; and generating the 3D location of the stationary traffic control object based on a centroid of the final clustered points.

16. A non-transitory computer-readable medium having instructions stored thereon that, when executed by at least one computing device, cause the at least one computing device to perform operations comprising:

selecting a bounding box associated with a stationary traffic control object based on two-dimensional (2D) data;

arranging the bounding box about object points in a three-dimensional (3D) point cloud of an environment external to a vehicle generated via one or more sensors, wherein the object points are associated with the stationary traffic control object;

assigning a weight to each point of the 3D point cloud based on a position of the point relative to the bounding box and based on a result of an occlusion test, wherein the result is determined by:

imposing a first representation to a first collection of points, the first representation being in a first predefined shape, imposing a second representation to a second collection of points, the second representation being in a second predefined shape different from the first predefined shape, and assigning higher weight for the first collection of points than the second collection of points, the first collection of points being closer to the one or more sensors than the second collection of points to the one or more sensors;

filtering the weighted points; and generating a 3D location of the stationary traffic control object based on the filtered points.

17. The non-transitory computer-readable medium of claim 16, wherein the operations further comprise:

generating a square frustum extending between the position of the vehicle and the bounding box in the 3D point cloud; and incrementing the weight of each point of the 3D point cloud that is located within the square frustum.

18. The non-transitory computer-readable medium of claim 16, wherein the operations further comprise incrementing the weight of each point of the 3D point cloud that is located distal to the bounding box along a longitudinal axis extending between the position of the vehicle and the bounding box, or located radially adjacent to the longitudinal axis.

19. The non-transitory computer-readable medium of claim 16, wherein the operations further comprise:

clustering the filtered points; and generating the 3D location of the stationary traffic control object based a comparison of the clustered points to predetermined data associated with a size and shape of the stationary traffic control object.

20. The non-transitory computer-readable medium of claim 16, wherein the operations further comprise:

clustering the filtered points to form potential clustered points;

comparing the potential clustered points to predetermined data associated with a size and shape of the stationary traffic control object to determine final clustered points; and generating the 3D location of the stationary traffic control object based on a centroid of the final clustered points.

* * * * *